(12) United States Patent
Tanner et al.

(10) Patent No.: US 6,945,193 B1
(45) Date of Patent: Sep. 20, 2005

(54) CAT LITTER HOLDING ASSEMBLY

(76) Inventors: James C. Tanner, 930 Main St., Conneaut, OH (US) 44030; Maurine A. Tanner, 930 Main St., Conneaut, OH (US) 44030

( * ) Notice: Subject to any disclaimer, the term of this patent is extended or adjusted under 35 U.S.C. 154(b) by 0 days.

(21) Appl. No.: 10/814,667

(22) Filed: Apr. 1, 2004

(51) Int. Cl.[7] ............................................. A01K 29/00
(52) U.S. Cl. ..................................................... 119/165
(58) Field of Search ......................... 119/165, 161, 419

(56) References Cited

U.S. PATENT DOCUMENTS

| | | | |
|---|---|---|---|
| 3,428,026 A | 2/1969 | Sohmers et al. | |
| 3,885,523 A | 5/1975 | Coleman | |
| 4,021,975 A * | 5/1977 | Calkins | 52/64 |
| 4,029,048 A | 6/1977 | Gershbein | |
| 4,111,157 A | 9/1978 | Haugen | |
| 4,348,982 A | 9/1982 | Selby | |
| 5,092,270 A * | 3/1992 | Simons et al. | 119/453 |
| 5,092,277 A * | 3/1992 | Baillie et al. | 119/165 |
| 5,134,973 A | 8/1992 | Sarullo | |
| 5,165,366 A * | 11/1992 | Harvey | 119/165 |
| 5,247,901 A * | 9/1993 | Landon et al. | 119/419 |
| 5,361,725 A * | 11/1994 | Baillie et al. | 119/165 |
| 5,566,640 A | 10/1996 | Krumrei | |
| D383,262 S * | 9/1997 | Benwell | D30/161 |
| 5,678,509 A * | 10/1997 | Dillon | 119/496 |
| 5,713,302 A * | 2/1998 | Walter | 119/165 |
| 5,738,040 A * | 4/1998 | Simmons | 119/165 |
| 5,842,438 A * | 12/1998 | Messmer | 119/165 |
| 5,887,546 A * | 3/1999 | Gruel | 119/165 |
| 5,975,017 A * | 11/1999 | Cameron | 119/165 |
| 6,176,201 B1 | 1/2001 | Fields | |
| 6,237,534 B1 * | 5/2001 | Schwartz | 119/165 |
| 6,415,738 B1 * | 7/2002 | Hotter | 119/165 |
| 6,659,045 B2 * | 12/2003 | Thompson | 119/482 |
| 6,761,130 B1 * | 7/2004 | Vicknair | 119/165 |

* cited by examiner

Primary Examiner—Son T. Nguyen

(57) ABSTRACT

A cat litter holding assembly includes a housing that has a bottom wall, a front wall, a back wall, a first side wall and a second side wall. An upper edge of the housing defines an upper opening. A covering is hingedly attached to an upper edge of the back wall. A partition wall is mounted within the housing and extends from the front wall toward the back wall. The partition wall divides the housing into a first portion and a second portion. The front wall has a front opening extending therethrough that extends into the first portion. A mat is removably positioned in the first portion and substantially covers the bottom wall of the first portion. The mat has a top side has a plurality of bristles extending upwardly therefrom. A litter pan is removably positioned in the second portion.

2 Claims, 4 Drawing Sheets

US 6,945,193 B1

CAT LITTER HOLDING ASSEMBLY

BACKGROUND OF THE INVENTION

1. Field of the Invention

The present invention relates to cat litter holding devices and more particularly pertains to a new cat litter holding device for deterring a dog from accessing a litter pan.

2. Description of the Prior Art

The use of cat litter holding devices is known in the prior art. U.S. Pat. No. 3,885,523 describes a housing have a grated floor spaced above from a bottom floor. As a cat leaves the housing, the cat must walk over the grated floor so that any litter caught on the paws of the cat will fall through the grated floor. Another type of cat litter holding device is U.S. Pat. No. 5,566,640 that includes a housing having a plurality of chambers therein so that air pockets may be trapped within the housing to prevent the escape of odors from the housing. Yet another litter holding device is U.S. Pat. No. 5,361,725 which utilizes three separate rooms through which a cat must travel in order to reach a litter pan. The purpose is again to retain the odors within the housing.

While these devices fulfill their respective, particular objectives and requirements, the need remains for a device that is specifically designed to prevent the unwanted entry of a dog into an area where the dog may access a litter pan. In particular, the housing should be of such a size and include a partition wall that must be navigated by dog before the dog can reach the litter pan.

SUMMARY OF THE INVENTION

The present invention meets the needs presented above by generally comprising a housing that has a bottom wall, a front wall, a back wall, a first side wall and a second side wall. An upper edge of the housing defines an upper opening extending into the housing. A covering is hingedly attached to an upper edge of the back wall. The covering is selectively positioned in an open position or in a closed position. A partition wall is mounted within the housing and extends from the front wall toward the back wall. A first portion of the housing is defined between the partition wall and the first side wall and a second portion of the housing is defined between the partition wall and the second side wall. The front wall has a front opening extending therethrough. The front opening extends into the first portion. The front opening has a bottom edge spaced from the bottom wall. A mat is removably positioned in the first portion and substantially covers the bottom wall of the first portion. The mat has a top side has a plurality of bristles extending upwardly therefrom. A litter pan is removably positioned in the second portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
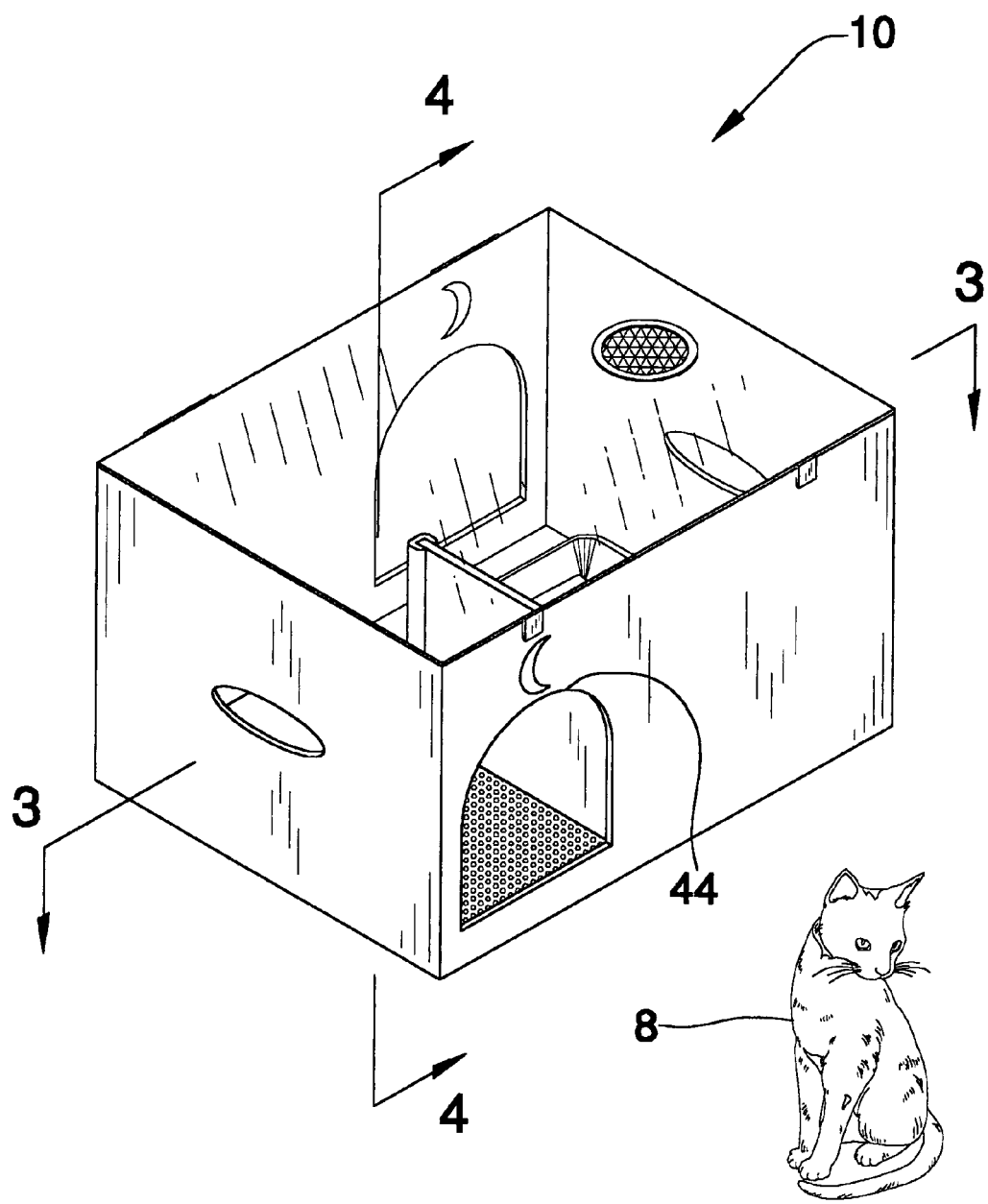
FIG. 1 is a schematic perspective view of a cat litter holding assembly according to the present invention.
Figure 2:
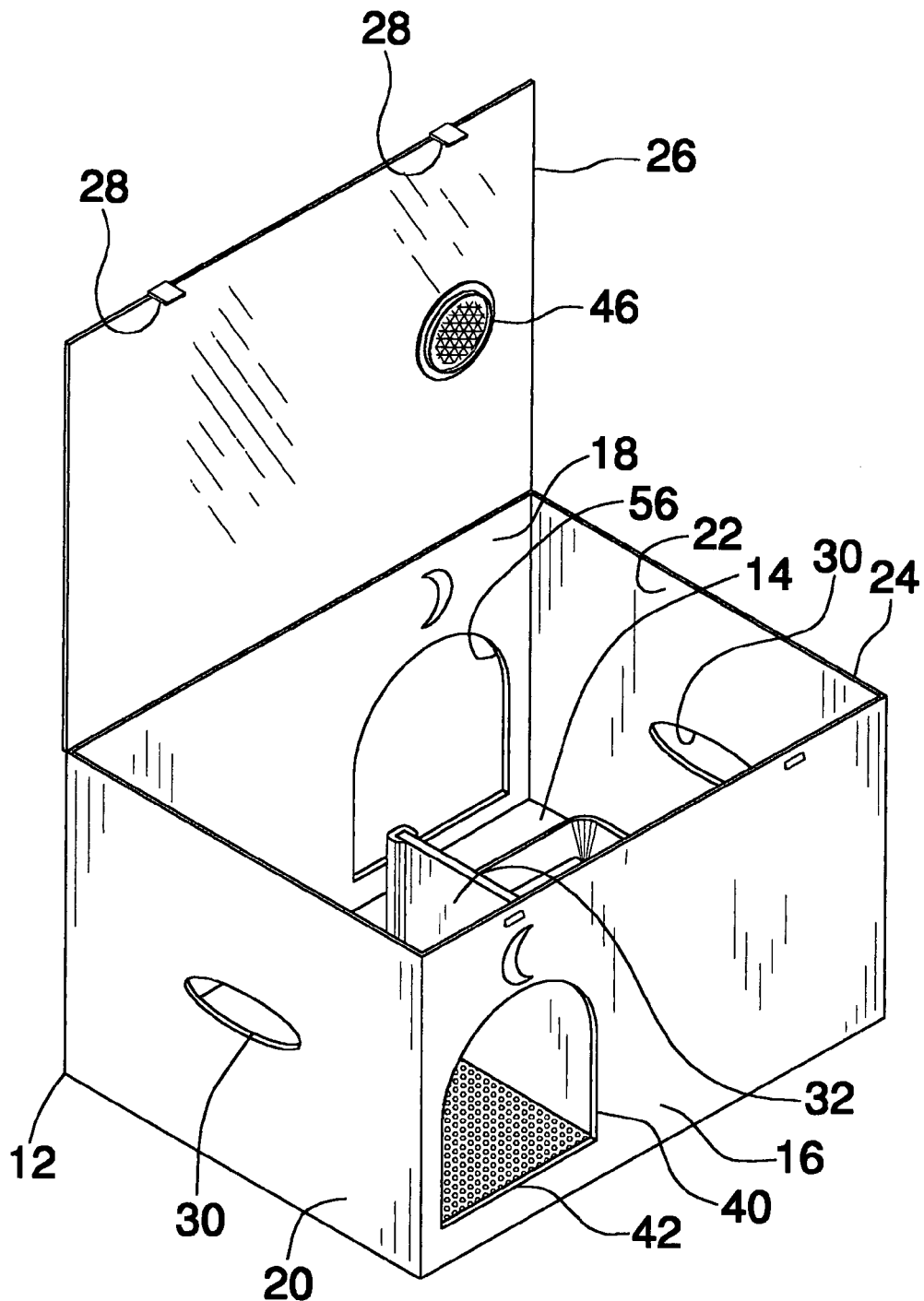
FIG. 2 is a schematic perspective view of the present invention.
Figure 3:
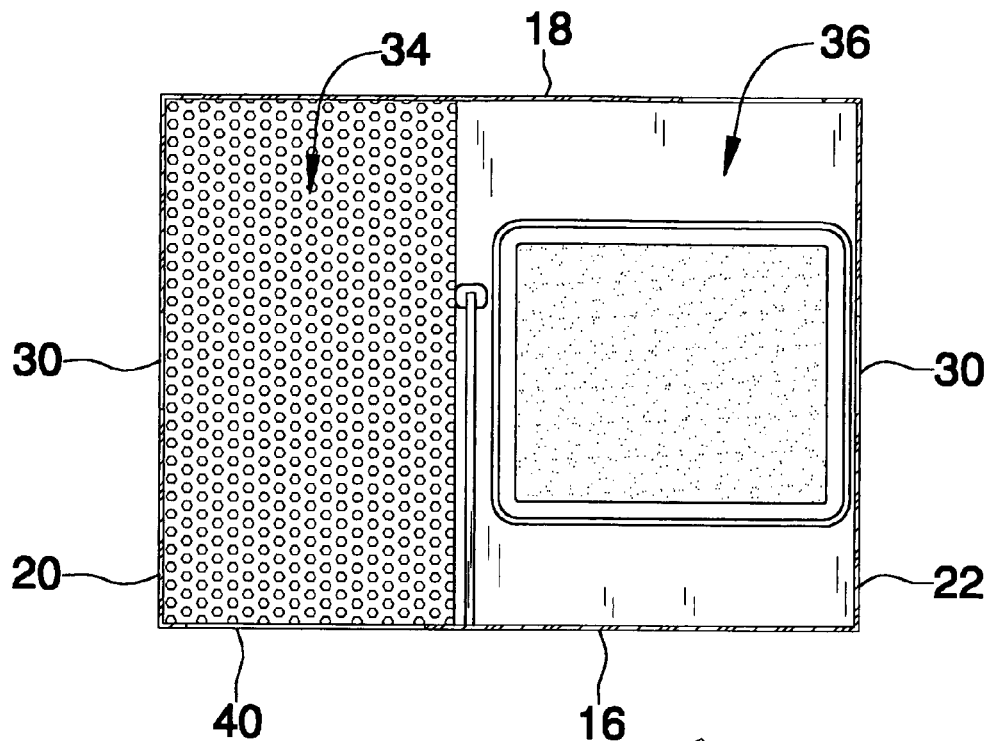
FIG. 3 is a schematic cross-sectional view taken along line 3—3 of FIG. 1 of the present invention.
Figure 4:
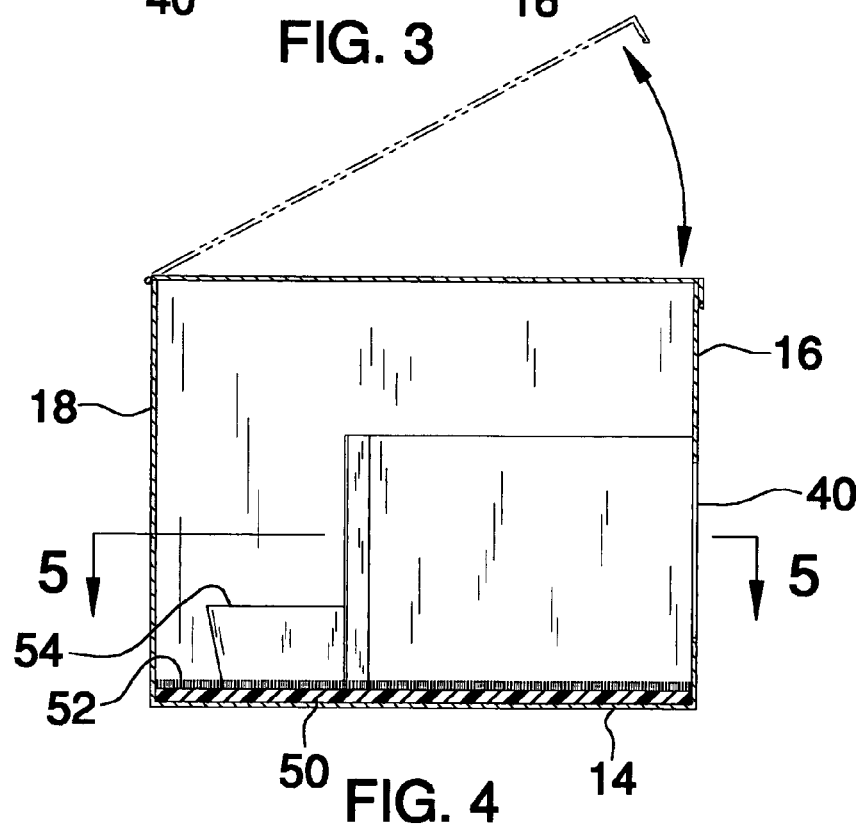
FIG. 4 is a schematic cross-sectional view taken along line 4—4 of FIG. 1 of the present invention.
Figure 5:
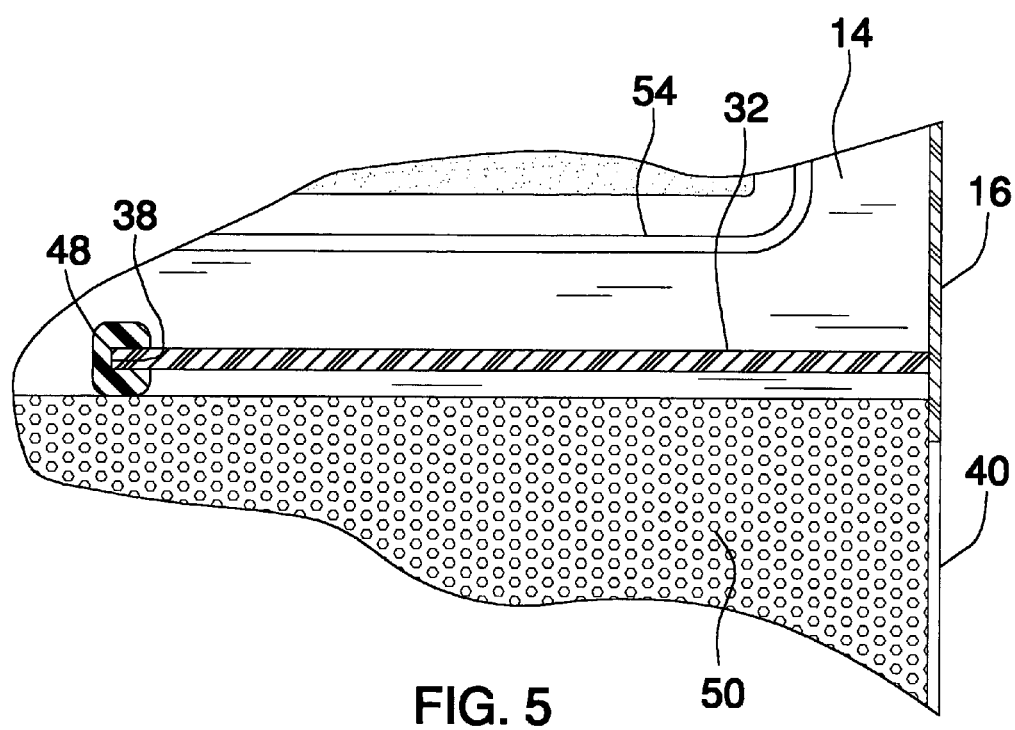
FIG. 5 is a schematic cross-sectional view taken along line 5—5 of FIG. 4 of the present invention.

With reference now to the drawings, and in particular to FIGS. 1 through 5 thereof, a new cat litter holding device embodying the principles and concepts of the present invention and generally designated by the reference numeral 10 will be described.

As best illustrated in FIGS. 1 through 5, the cat litter holding assembly 10 generally comprises a housing 12 that has a bottom wall 14, a front wall 16, a back wall 18, a first side wall 20 and a second side wall 22. An upper edge 24 of the housing 12 defines an upper opening extending into the housing 12. A covering 26 is hingedly attached to an upper edge of the back wall 18. The covering 26 is selectively positioned in an open position extending away from the upper edge 24 or in a closed position abutting the upper edge 24. The housing 12 has a height generally between 14 inches and 18 inches, a length generally between 24 inches and 28 inches, and a width generally between 18 inches and 22 inches. Preferably, the covering 26 is substantially transparent to allow a user of the assembly to see into the housing 12. Closing tabs 28 may be attached to the covering 26 for securing the covering 26 in the closed position. Alternatively, a flange may be attached to a peripheral edge of the covering 26. Each of the first 20 and second 22 side walls has an aperture extending 30 therethrough. The apertures 30 are generally centrally disposed and preferably each has a generally oblong shape. The apertures 30 form handholds for carrying the housing 12.

A partition wall 32 is mounted within the housing 12 and extends from the front wall 16 toward the back wall 18. A first portion 34 of the housing 12 is defined between the partition wall 32 and the first side wall 20. A second portion 36 of the housing 12 is defined between the partition 32 wall and the second side wall 22. The partition wall 32 has a free edge 38 directed toward the back wall 18. The partition wall 32 extends between 9 inches and 11 inches away from the front wall 16 and is spaced between 7 inches and 8 inches from the first side wall 20. The partition wall 32 has a height generally equal to 8 inches which allows a cat to jump over the partition wall 32 between the partition wall 32 and the cover 26.

The front wall 16 has a front opening 40 extending therethrough. The front opening 40 extends into the first portion 34. The front opening 40 has a bottom edge 42 that is spaced between ½ inch and 2 inches from the bottom wall 14. This aids in preventing the escape of any material from within the housing 12. The front opening 40 generally extends from the partition wall 32 to the first side wall 20. The front opening 40 has a height generally between 9 inches and 12 inches and preferably has an arcuate upper edge 44.

An air filter 46 is positioned in the covering 26. The air filter 46 is positioned over the second portion 36 when the covering 26 is in the closed position. The air filter 46 filters the air that travels into the housing 12 through the front opening 40 so that it may escape the housing 12 through the covering 26 after being cleaned of foul odors. The air filter 46 may be of conventional means.

A cushioning material 48 is mounted on and extends along the free edge 38 of the partition wall 32. The cushioning material 48 is preferably comprised of an elastomer or foam. The cushioning material 48 prevents injury to an animal walking between the free edge 38 and the back wall 18.

A mat 50 is removably positioned in the first portion 34 and substantially covers the bottom wall 14 of the first portion 34. The mat 50 has a top side that has a plurality of bristles 52 extending upwardly therefrom. The mat 50 catches excess litter which may be positioned on the paws of a cat using the assembly. The bristles 52 may be of a course material, or a soft, grass-like material. A litter pan 54 is removably positioned in the second portion 36.

A secondary opening 56 may be positioned in the back wall 18 which extends into the second portion 36 and is generally the size and shape as the front opening 40. If a secondary opening 56 is provided, it is preferred that the partition wall 32 is movable from the front wall 16 to the back wall 18 so that the orientation of an interior of the housing 12 is reversible. This allows a person to orientate the entry of the housing 12 to either the front wall 16 or back wall 18 as needed.

In use, cat litter is placed in the pan and the pan is positioned in the second portion. Generally, the second side wall 22 and the back wall 18 are positioned against adjoining walls so that air flowing into the front opening 40 must travel outwardly through the filter 46. A cat enters 8 the housing 12 through the front opening 40 and walks around the partition wall 32 to get to the litter pan 54. After using the litter pan 54, the cat 8 must again walk around, or jump over, the partition wall 32 to leave the housing 12. This forces the cat to walk over the mat 50 so that litter on the paws of the cat 8 is left on the mat 50 and enters the spaces between the bristles 52 so that it may be discarded later. The sizes of the housing 12, the first portion 34 and the front opening 40 prevents large dogs, and deters small dogs, from entering the housing 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A litter box assembly comprising:

a housing having a bottom wall, a front wall, a back wall, a first side wall and a second side wall, an upper edge of said housing defining an upper opening extending into said housing, a covering being hingedly attached to an upper edge of said buck wall, said covering being selectively positioned in an open position or in a closed position, said housing having a height generally between 14 inches and 18 inches, said housing having a length generally between 24 inches and 28 inches, said housing having a width generally between 18 inches and 22 inches, said covering being substantially transparent, each of said first and second side walls having an aperture extending therethrough, each of said apertures being generally centrally disposed, each of said apertures having a generally oblong shape;

a partition wall being mounted within said housing and extending from said front wall toward said back wall, a first portion of said housing being defined between said partition wall and said first side wall, a second portion of said housing being defined between said partition wall and said second side wall, said partition wall having a free edge directed toward said back wall, said partition wall extending between 9 inches and 11 inches away from said front wall, said partition wall being spaced between 7 inches and 8 inches from said first side wall, said partition wall having a height generally equal to 8 inches;

said front wall having a front opening extending therethrough said front opening extending into said first portion, said front opening having a bottom edge spaced from said bottom wall, said front opening generally extending from said partition wall to said first side wall, said front opening having a height generally between 9 inches and 12 inches, said front opening having an arcuate upper edge;

an air filter being positioned in said covering, said air filter being positioned over said second portion when said covering is in said closed position;

a cushioning material being mounted on and extending along said free edge of said partition wall;

a mat being removably positioned in said first portion and substantially covering said bottom wall of said first portion, said mat having a top side having a plurality of bristles extending upwardly therefrom; and a litter pan being removably positioned in said second portion.

2. A litter box assembly comprising:

a housing having a bottom wall, a front wall, a back wall, a first side wall and a second side wall, an upper edge of said housing defining an upper opening extending into said housing, a covering being hingedly attached to an upper edge of said back wall, said covering being selectively positioned in an open position or in a closed position, each of said first and second side walls having an aperture extending therethrough, each of said apertures being generally centrally disposed, each of said apertures having a generally oblong shape;

a partition wall being mounted within said housing and extending from said front wall toward said back wall, a first portion of said housing being defined between said partition wall and said first side wall, a second portion of said housing being defined between said partition wall and said second side wall, said partition wall having a free edge directed toward said back wall;

said front wall having a front opening extending therethrough, said front opening extending into said first portion, said front opening having a bottom edge spaced from said bottom wall, said front opening generally extending from said partition wall to said first side wall;

an air filter being positioned in said covering, said air filter being positioned over said second portion when said covering is in said closed position;

a cushioning material being mounted on and extending along, said free edge of said partition wall;

a mat being removably positioned in said first portion and substantially covering said bottom wall of said first portion, said mat having a top side having a plurality of bristles extending upwardly therefrom; and a litter pan being removably positioned in said second portion.

\* \* \* \* \*